(12) United States Patent
Marupaduga et al.

(10) Patent No.: US 10,187,895 B1
(45) Date of Patent: Jan. 22, 2019

(54) DYNAMIC SCALING DOWN OF RESOURCE BLOCK ALLOCATION BASED ON DISPROPORTIONATE ALLOCATION AND BASED ON USE OF HIGH-ORDER MCS

(71) Applicant: Sprint Spectrum L.P., Overland Park, KS (US)

(72) Inventors: Sreekar Marupaduga, Overland Park, KS (US); Andrew M. Wurtenberger, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 115 days.

(21) Appl. No.: 15/424,482

(22) Filed: Feb. 3, 2017

(51) Int. Cl.
| | | |
|---|---|---|
| *H04W 72/04* | (2009.01) | |
| *H04W 28/26* | (2009.01) | |
| *H04W 28/02* | (2009.01) | |
| *H04L 1/00* | (2006.01) | |
| *H04W 72/12* | (2009.01) | |

(52) U.S. Cl.
CPC ......... *H04W 72/048* (2013.01); *H04L 1/0003* (2013.01); *H04L 1/0009* (2013.01); *H04W 28/0205* (2013.01); *H04W 28/0278* (2013.01); *H04W 28/26* (2013.01); *H04W 72/0446* (2013.01); *H04W 72/0453* (2013.01); *H04W 72/1284* (2013.01)

(58) Field of Classification Search
CPC ............. H04W 28/0278; H04W 72/04; H04W 72/1231; H04W 72/1284; H04W 72/042; H04W 72/0486; H04W 72/1252; H04W 24/10; H04L 47/30
USPC ........................................................ 370/330
See application file for complete search history.

(56) References Cited

U.S. PATENT DOCUMENTS

| | | | |
|---|---|---|---|
| 9,363,822 B1 | 6/2016 | Oroskar et al. | |
| 9,560,660 B1 | 1/2017 | Oroskar et al. | |
| 2010/0290559 A1* | 11/2010 | Futagi .................. | H04L 1/0004 375/295 |
| 2011/0149792 A1* | 6/2011 | Nakano ................. | H04W 24/10 370/252 |
| 2013/0215784 A1* | 8/2013 | Nordstrom .......... | H04W 72/085 370/252 |

* cited by examiner

*Primary Examiner* — Marsha D Banks Harold
*Assistant Examiner* — Elton Williams

(57) ABSTRACT

A method and system to help control air interface resource allocation. A base station monitors for each served UE a ratio of physical resource block (PRB) allocation to queued data, as a PRB/data ratio. The base station then detects that the PRB/data ratio of a first served UE has been threshold lower than the PRB/data ratio of each of a plurality of second served UEs, and the base station responsively selects at least one of the second UEs based on its modulation and coding scheme (MCS) being relatively high, and the base station limits PRB allocation to the selected UE to help reduce its PRB/data ratio and to thereby help achieve a level of fairness in PRB allocation.

20 Claims, 3 Drawing Sheets

DYNAMIC SCALING DOWN OF RESOURCE BLOCK ALLOCATION BASED ON DISPROPORTIONATE ALLOCATION AND BASED ON USE OF HIGH-ORDER MCS

BACKGROUND

A typical cellular wireless network includes a number of base stations that radiate to define wireless coverage areas, such as cells and cell sectors, in which user equipment devices (UEs) can operate and engage in air-interface communication with the cellular wireless network. Each base station may then be coupled with network infrastructure that provides connectivity with one or more transport networks, such as the public switched telephone network (PSTN) and/or the Internet for instance. Within this arrangement, a UE operating in a coverage area of the cellular wireless network can engage in communication, via the cellular wireless network, with remote network entities or with other UEs operating in the cellular wireless network.

The cellular wireless network may operate in accordance with a particular air-interface protocol or "radio access technology," examples of which include Long Term Evolution (using Orthogonal Frequency Division Multiple Access (OFDMA) and Single Carrier Frequency Division Multiple Access (SC-FDMA)), Code Division Multiple Access (CDMA) (e.g., 1×RTT and 1×EV-DO), and Global System for Mobile Communications (GSM), among others. Generally, the agreed air-interface protocol may define a downlink (or forward link) for carrying communications from the base stations to UEs and an uplink (or reverse link) for carrying communications from UEs to the base stations.

In general, the air interface between a base station and served UEs will define a limited number of resources for carrying data communications.

By way of example, an LTE air interface operates on a carrier frequency that has a finite frequency bandwidth, such as 3 MHz, 5 MHz, 10 MHz, 15 MHz, or 20 MHz, for instance. The LTE air interface is then divided over time into a continuum of 10-millisecond frames each defining ten 1-millisecond subframes or TTIs, and each TTI is divided over time into 14 symbol segments in which data can be transmitted. Further, the carrier frequency bandwidth is divided into a sequence of 15 kHz subcarriers, with each subcarrier in a given symbol time segment defining a resource element in which data can be communicated using an applicable modulation scheme that can accommodate communication of up to a certain number of bits per resource element.

With this arrangement, the LTE air interface thus defines an array of resource elements for carrying data. Further, each TTI is divided into two 0.5-millisecond timeslots, and each timeslot is divided into physical resource blocks (PRBs) each being 12-subcarriers (i.e., 180 kHz) wide and 0.5-milliseconds in duration, thus encompassing 84 resource elements. Depending on the carrier bandwidth, the LTE air interface thus defines a limited number of PRBs per TTI. And depending on the modulation scheme, the LTE air interface can accommodate a limited number of bits communicated per resource element and thus per PRB.

In a representative cellular network, a base station may then employ a scheduler to dynamically allocate resources for communication of bearer data in PRBs between the base station and served UEs. In particular, for each UE, the base station could evaluate the UE's channel conditions (e.g., based on channel condition reports from the UE) and, based at least on the channel conditions, could decide a modulation and coding scheme (MCS) to serve the UE with, where the MCS could define (i) a modulation scheme establishing how many bits will be represented per resource element and (ii) a coding rate indicating how many of the bits represent actual data as opposed to error-correction coding bits. And for each UE, on a per TTI basis, the base station could allocate particular PRBs to carry data to or from the UE using the determined MCS. For a given TTI, the base station could then engage in signaling with the served UEs to designate the allocated PRBs and determined MCSs, and communication could proceed accordingly.

For instance, as the base station receives data for transmission over the air to various UEs, the base station may operate on a per-TTI basis to allocate particular PRB(s) for carrying data to particular UEs using the MCSs determined for those UEs based on their channel conditions. For each UE, the base station could then transmit to the UE a control message that designates the PRBs and the determined MCS, and the base station may accordingly transmit the data to UE in the designated PRBs and using the designated MCS. Thus, each UE could then receive the modulated transmission in the indicated PRBs and could demodulate the transmission in accordance with the indicated MCS, thus receiving the underlying data (subject to any need for retransmission).

And likewise, as UEs have data to transmit over the air to the base station, the UEs may send scheduling requests to the base station, and the base station may similarly operate on a per-TTI basis to allocate particular PRB(s) for carrying data from particular UEs using the MCSs determined for those UEs. For each UE, the base station may then transmit to the UE a control message that designated the PRBs and the determined MCS. And the UE may then accordingly transmit to the base station in the designated PRBs and using the designated MCS. Thus, the base station could receive the modulated transmission in the indicated PRBs from each UE and could demodulate the received transmission in accordance with the indicated MCS, thus receiving the underlying data (also subject to any need for retransmission).

In addition, the LTE air interface also reserves certain resource elements per TTI for special use rather than for carrying bearer data between the base station and served UEs. For instance, on the downlink, the first one, two, or three symbol time segments per TTI are reserved for control channel use (e.g., for transmitting PRB scheduling directives), various resource elements distributed throughout each TTI are reserved to provide a broadcast reference signal that UEs can evaluate to detect and determine coverage strength and quality, and other resource elements are reserved for other uses. And on the uplink, an upper portion and a lower portion of the frequency bandwidth per TTI are reserved for control channel use. This reservation of resource elements for other uses thus further limits resources on the air interface for use to carry data to and from UEs.

OVERVIEW

For each UE served by a base station (presumably in a connected or active mode), the base station may thus dynamically allocate PRBs or other such air interface resources to the UE on a per TTI basis or the like as noted above.

In practice, the entity in this process that will be transmitting data (whether the base station, for downlink transmission, or the UE, for uplink transmission) will typically queue data in a buffer awaiting transmission of data over the air interface. For instance, for downlink transmission, the base station may have for each served UE a respective queue of data that the base station has received for transmission to the UE and that is awaiting transmission over the air interface to the UE. And for uplink transmission, each UE may have a queue of data that the UE seeks to transmit to the base station and that is awaiting transmission over the air interface to the base station.

Further, the base station could be aware of the amount of data so queued for transmission. For instance, for downlink transmission, the base station itself could maintain the queue per UE and could thus have an indication of the quantity of data (e.g., number of bits or bytes) in queue at any time awaiting transmission to the UE. And for uplink transmission, each UE could provide the base station with a buffer-status-report control signal that indicates the quantity of data in queue at the UE awaiting transmission to the base station.

As a result of this data-queuing and PRB allocation process, each UE that is served by the base station will have a respective PRB/data ratio (perhaps per TTI or otherwise over a sliding window of time) of (i) the quantity of PRBs allocated to the UE for transmission in a direction between the base station and the UE to (ii) the quantity of data queued for transmission in the direction between the base station and the UE, where the direction could be downlink or uplink. For instance, on the downlink, this PRB/data ratio could be computed by dividing the number of downlink PRBs allocated to the UE per TTI or other window of time by the quantity of data that the base station has buffered at or about that time for transmission over the air to the UE. And on the uplink, this PRB/data ratio could be computed by dividing the number of uplink PRBs allocated to the UE per TTI by the quantity of data that the UE has buffered at or about that time for transmission over the air to the base station. Further, the PRB/data ratio could be computed on a sliding window, perhaps as an average over a most recent period of time.

When a base station is serving multiple UEs at once, a problem that can arise is that a given one of the UEs may have a relatively low PRB/data ratio while other UEs may each have a relatively high PRB/data ratio. Given that this is a ratio of PRBs to data in queue for transmission, this arrangement could be arguably unfair.

Disclosed herein is a method and system to help address this situation. In accordance with the disclosure, if a base station determines that the PRB/data ratio of a first served UE is threshold lower than the PRB/data ratio of each of a plurality of second served UEs, the base station will then take remedial action to help improve fairness. In particular, the base station will respond to that situation by selecting at least one of the second UEs to be subject to scaled-down PRB allocation and thus a reduction in PRB/data ratio, with the selecting being based on the MCS that the base station serves the selected second UE with. For example, the base station could determine which of the second UEs has the highest-order MCS (i.e., to represent the greatest quantity of actual data per PRB) of all of the second UEs and could select that second UE to have its PRB allocation reduced. Or the base station could determine which of the second UEs has an MCS that is at least a threshold high order and could select that second UE to have its PRB allocation reduced. The base station could then reduce the PRB allocation to the selected second UE, such as by imposing a scaling factor in the scheduling process to result in reduction of the selected UE's PRB/data rate.

Accordingly, in one respect, disclosed is a method for controlling air interface resource allocation by a base station in a wireless communication system in which the base station serves over an air interface at least a first UE and a plurality of second UEs, where the air interface has a predefined quantity of PRBs per unit time for carrying data in a direction between the base station and UEs, and where each UE has a respective PRB/data ratio per unit time, each UE's respective PRB/data ratio per unit time defining a ratio per unit time of (i) number of PRBs allocated by the base station to the UE for transmission of data in the direction between the base station and the UE to (ii) quantity of data queued for transmission in the direction between the base station and the UE.

As disclosed, the method includes the base station detecting that the first UE's PRB/data ratio has been threshold lower than each of the second UEs' PRB/data ratios. And the method further includes, responsive to the detecting, (i) the base station selecting at least one of the second UEs, where the selecting is based on a MCS that the base station is serving the selected second UE with, and (ii) based on the selecting, the base station limiting PRB allocation to the selected second UE to reduce the selected second UE's PRB/data ratio.

And in another respect, disclosed is a base station operable to carry out such a method. In particular, the base station includes a wireless communication interface, including an antenna structure and transceiver, configured to communicate over the air interface with the UEs. And the base station includes a controller for controlling the air interface resource allocation, where the controller is configured to (a) detect that the first UE's PRB/data ratio has been threshold lower than each of the second UEs' PRB/data ratios and (b) responsive to the detecting, (i) select at least one of the second UEs, where the selecting is based on a modulation and coding scheme (MCS) that the base station is serving the selected second UE with, and (ii) based on the selecting, limit PRB allocation to the selected second UE to reduce the selected second UE's PRB/data ratio.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Features of the present method and system will be described by way of example in the context of an LTE communication system. However, it will be understood that the disclosed principles can be applied as well in the context of other types of communication systems, such as with other air interface protocols and where air interface resources take forms other than PRBs, for instance. Further, it will be understood that the disclosure is provided merely by way of example, and that numerous changes can be made to the disclosed structural and functional features, including but not limited to adding, removing, moving, distributing, combining, replicating, or re-ordering features, while remaining within the spirit of the disclosure. In addition, it will be understood that features disclosed herein as being carried out by one or more entities could be implemented by the entity being programmed with and executing computer instructions to carry out the features.

Figure 1:
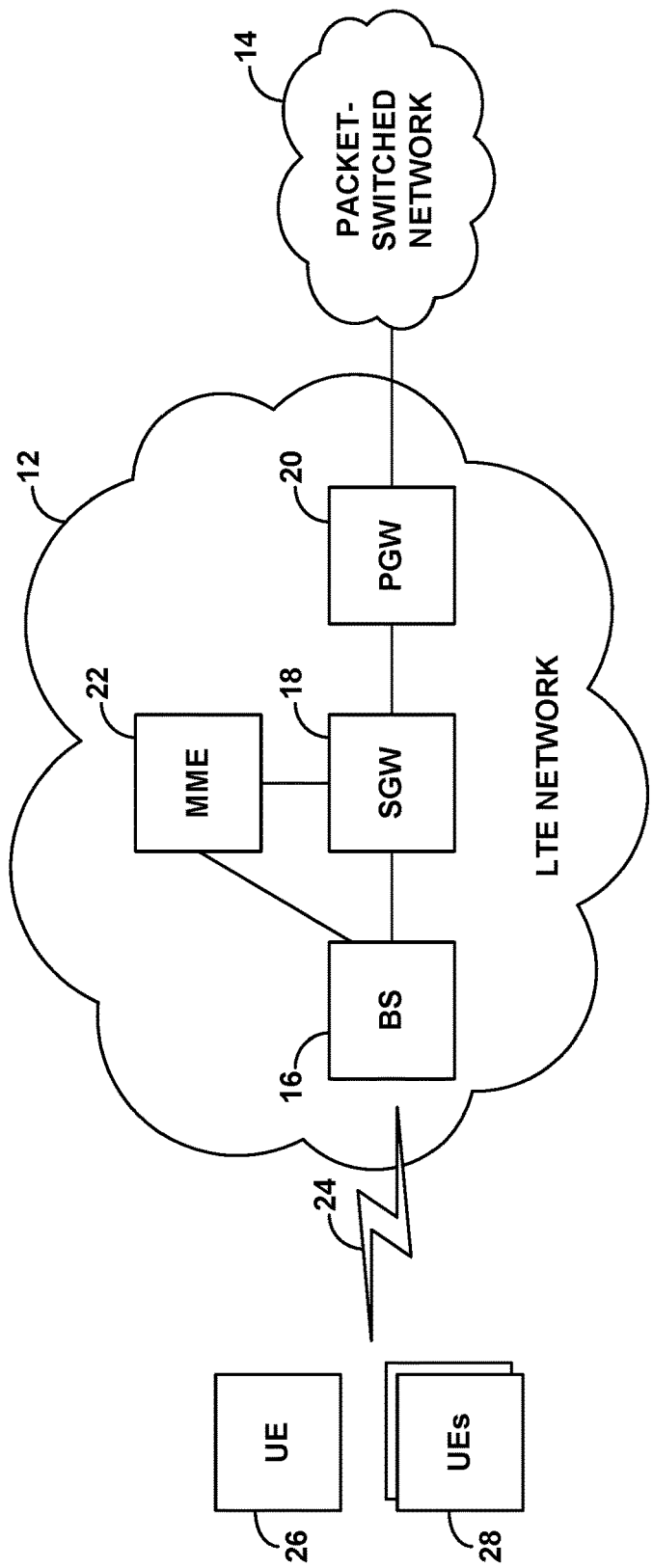
FIG. 1 is a simplified block diagram of an example communication system in which features of the present disclosure can be implemented.

Referring to the drawings, as noted above, FIG. 1 is a simplified block diagram of an example wireless communication system in which features of the present disclosure can be implemented. As shown in FIG. 1, the system includes at its core an example LTE network 12 that operates to provide connectivity between UEs and a packet-switched transport network 14 such as the Internet. The example LTE network includes a base station (e.g., LTE evolved Node B (eNodeB)) 16, a serving gateway (SGW) 18, a packet-data network gateway (PGW) 20, and a mobility management entity (MME) 22. Further, the figure depicts several UEs currently being served by the base station over an air interface 24, including a first UE 26 and a plurality of second UEs 28.

As a general matter, the base station 16 operates to provide coverage in which to serve and communicate with UEs via air interface 24, the SGW 18 and PGW 20 operate as gateways to pass UE communications between the base station 16 and network 14, and the MME operates as a LTE network controller, such as to manage tracking and paging of UEs and to manage setup of bearer connections, via the gateways, to enable communication by UEs on network 14.

In accordance with LTE as mentioned above, the air interface 24 between the base station and served UEs could operate on one or more carriers each having a defined bandwidth such as one of those noted above for instance. And on each such carrier, the air interface is divided over time into TTIs that are each divided over at least the carrier bandwidth (and in respective timeslots) into a plurality of PRBs, each made up of a number of resource elements on which binary information can be modulated using an applicable modulation scheme. In particular, on both the downlink and the uplink, a shared channel space defines these PRBs (with the exception of certain resource elements reserved for other purposes), and bits can be modulated in the resource elements of each PRB using a designated MCS.

Various MCSs are possible, with each MCS having an MCS "order" corresponding with or indicating the extent to which actual data (i.e., other than error correction coding bits) that can be communicated per resource element. A higher order MCS allows a greater extent of data to be communicated per resource element, whereas a lower order MCS allows a lesser extent of data to be communicated per resource element. As noted above, each MCS could include an associated modulation scheme and an associated coding rate.

The coding rate could be a channel coding rate that provides an associated extent of error-correction coding bits for every bit of actual data (e.g., bearer data being communicated between the UE and packet-switched network 14), and so a lower coding rate (defining a lower order MCS for a given modulation scheme) could mean that more of the bits to be communicated over the air interface are error-correction coding bits rather than actual data bits, whereas a higher coding rate (defining a higher order MCS for a given modulation scheme) could mean that fewer of the bits to be communicated over the air interface are error-correction coding bits and thus more are actual data bits.

Given a particular coding rate and associated coded bit stream that includes actual data and perhaps error-correction coding bits, the modulation scheme then defines the manner in which subcarriers of the air interface could be modulated to represent bits of the stream. Various modulation schemes are known, ranging from a very low-order scheme (associated with a low-order MCS, subject to further variation of order based on coding rate) to a very high-order scheme (associated with a high-order MCS, subject further to variation of order based on coding rate), with each modulation scheme used in a given resource element providing for representation of an associated quantity of bits by the resource element. For example, (i) Quadrature Phase Shift Keying (QPSK) enables each resource element to represent 2 bits, (ii) 16 Quadrature Amplitude Modulation (16QAM) enables each resource element to represent 4 bits, (iii) 64QAM enables each resource element to represent 6 bits, and (iv) 256QAM enables each resource element to represent 8 bits. Other examples are possible as well.

Thus, in practice, the possible MCSs could range in order from a low-order modulation scheme (possibly QPSK or lower) to a high-order modulation scheme (possibly 256QAM or higher) including, within each modulation scheme, possibly a range of coding rates ranging from a low-order coding rate up to a high-order coding rate. Consequently, overall, possible MCSs could range from a lowest-order modulation scheme with a lowest-order coding rate up to a highest-order modulation scheme with a highest order coding rate.

In operation, when each UE first enters into coverage of network 12, the UE could engage in signaling with the base station 16 to establish a radio-link-layer connection over the air interface between the UE and the base station, and the UE could then initiate attachment with the network by transmitting an attach request over the radio-link-layer connection to the base station, which the base station could forward to the MME. After authenticating the UE, the MME could then engage in signaling with the base station and with the SGW to set up for the UE one or more bearers each defining logical tunnels for carrying data between the UE and the PGW, and the MME may also set up one or more such bearers at other times while the UE is being served by the network. Each such bearer could have an associated quality of service class level, designated by a quality of service class indicator (QCI) value, which could indicate various service priority attributes of the bearer, such as guaranteed bit rate level or the like. Further, upon initial attachment, the PGW could also assign to the UE an Internet Protocol address for use by the UE to engage in communication via one or more bearers on the packet-switched network 14.

Once so attached and having one or more bearers, the base station could then serve the UE in a connected mode in which the base station schedules allocation of air interface resources for use to carry data communication to and from the UE.

As discussed above, in each direction of transmission between the base station and served UEs, the transmitting entity could maintain data queues for buffering received data awaiting transmission over the air to the other entity. For instance, the base station could maintain such a queue respectively for each connected UE, and as the base station receives data from the SGW for transmission to particular UEs, the base station could place the data in the respective UEs' queue, pending scheduling and transmission of the data over the air to the respective UEs. Further, each connected UE having data to transmit over the air to the base station could hold the data in a queue, pending scheduling and transmission of the data over the air to the base station.

The base station's scheduling of air interface resource allocation for UEs could then take into account both the UEs' channel conditions and the limited capacity of PRBs given the finite frequency bandwidth of the air interface.

As to channel conditions, the UE may regularly evaluate the reference signal that the base station broadcasts on the air interface and report to the base station a channel quality indicator (CQI) indicative of the reference signal receive strength and/or of one or more other air interface quality metrics. Further, the base station could itself evaluate the UEs channel quality based on uplink communications from the UE. As noted above, based on the UE's channel quality, the base station could then determine what MCS should be used for air interface communication with the UE, i.e., what MCS the base station should serve the UE with. To facilitate this, for instance, the base station could map the UE's CQI to a corresponding MCS, using a standard CQI-MCS mapping table. Further, the determined MCS for a UE may vary from time to time as the UE's channel conditions vary from time to time.

As to the limited capacity of PRBs on the air interface, the base station may then allocate the PRBs to UEs in accordance with a scheduling algorithm, taking into account that the PRBs per unit time (e.g., per TTI) may need to be distributed among numerous concurrently served UEs. For instance, if the base station is serving 10 UEs and there are 100 PRBs per TTI, the base station could allocate 10 of the PRBs respectively to each of the UEs, giving all of the UEs an equal portion (or roughly equal portion) of the air interface capacity per TTI. Or the base station could take into account various prioritization factors in deciding how many PRBs to allocate to particular UEs. For instance, the base station could give higher priority to PRB allocation for communication on a higher priority bearer than for communication on a lower priority bearer, as indicated by QCI. Other examples are possible as well.

For a given TTI, once the base station has determined which PRB(s) the base station will allocate to a given UE and has determined the MCS that will be used for the communication, the base station could then transmit to the UE (on a downlink control channel) a downlink control information (DCI) message that specifies the PRBs and the MCS. For downlink communication, the base station could provide this DCI message in the same TTI that contains the allocated PRBs and could thus transmit the data accordingly in that same TTI, for receipt by the UE. For uplink communication, the base station could provide this DCI message in a TTI that is 4 milliseconds earlier than the TTI that contains the allocated PRBs, so that the UE could then prepare for and engage in data transmission accordingly in the designated PRBs.

In accordance with the present disclosure, while the base station is serving multiple connected UEs, the base station will monitor a PRB/data ratio respectively for each UE. As noted above, the PRB/data ratio represents a ratio of (i) the quantity of PRBs that the base station allocates to the UE per unit time for transmission over the air in a direction to (ii) the quantity of data that is queued for transmission over the air in that direction.

For instance, if the downlink is at issue, then the PRB/data ratio for each UE could be a ratio of (i) the number of PRBs that the base station has been allocating to the UE per TTI or per other unit time to (ii) the number of bits or other quantity of data that the base station has queued for transmission to the UE, possibly computed over time on a sliding window basis, such as on average per TTI over a most recent past designated number of TTIs. And if the uplink is at issue, then the PRB/data ratio for each UE could be a ratio of (i) the number of PRBs that the base station has been allocating to the UE per TTI or per other unit of time to (ii) the number of bits or other quantity of data that the UE has queued for transmission to the base station, also possibly computed over time on a sliding window basis. Further, the ratio could incorporate various constant multipliers or other factors as well, or might be limited to the numerator and denominator noted here.

In practice, the base station may determine the PRB/data ratio per UE (for a given direction of communication, downlink or uplink) every millisecond or other period or in response to various triggering events. And the base station could thus maintain an indication for each UE of a latest or currently determined PRB/data ratio for the UE.

Per the present disclosure, the base station could then evaluate the PRB/data ratio of various connected UEs and could determine that the PRB/data ratio of one UE has been relatively low while the PRB/data ratio of each of other UEs has been relatively high. To help improve fairness, the base station could then select one of the other UEs, based on the selected UE being served with a relatively high-order MCS, and the base station could then scale down the PRB allocation for the selected UE. Technically, this process could thereby help to make more PRBs available to serve the UE that has a had a low PRB/data ratio, and the use of MCS as a basis to select the UE to be subject to this PRB allocation limitation could provide fairness, as such a UE is one that is receiving a relatively high-order MCS and thus a relatively high data rate in any event.

Figure 2:
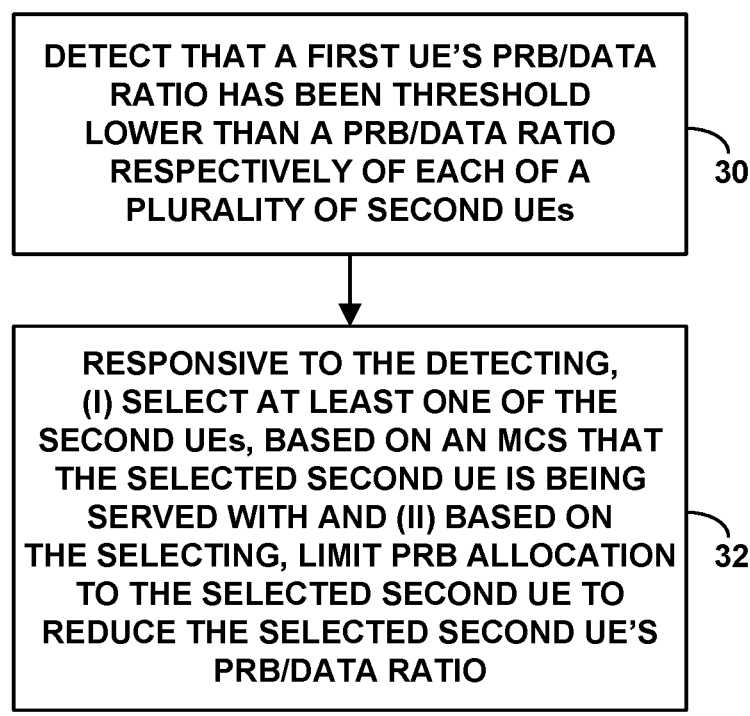
FIG. 2 is flow chart depicting operations that can be carried out in accordance with an example method.

FIG. 2 is next a flow chart depicting operations that can be carried out in accordance with the present disclosure to help control air interface resource allocation. In practice, this method could be carried out by a base station as discussed above, in a system such as that shown in FIG. 1, where the base station serves over an air interface at least the first UE 26 and the plurality of second UEs 28. In line with the discussion above, the air interface in this arrangement could have a predefined quantity of physical resource blocks (PRBs) per unit time for carrying data in a direction between the base station and UEs, such as a number of PRBs that could fit within the TTI given the frequency bandwidth (one or more carriers) on which the base station provides service. Further, each UE could have a respective PRB/data ratio per unit time as discussed above. The method could then apply for air interface communication in a particular direction, such as downlink and/or uplink.

As shown in FIG. 2, at block 30, the method includes the base station detecting that the first UE's PRB/data ratio has been threshold lower than each of the second UEs' PRB/data ratios. And at block 32, the method includes, responsive to the detecting, (i) the base station selecting at least one of the second UEs, with the selecting being based on an MCS that the base station is serving the selected second UE with, and (ii) based on the selecting, the base station limiting PRB allocation to the selected second UE to reduce the selected second UE's PRB/data ratio.

As noted above, in a downlink implementation of this method, the quantity of data queued for transmission in the direction between the base station and a UE could be a quantity of data buffered at the base station and awaiting transmission over the air interface from the base station to the UE. Whereas, in an uplink implementation of the method, the quantity of data queued for transmission in the direction between the base station and the UE could be a quantity of data buffered at the UE and awaiting transmission over the air interface from the UE to the base station, in which case the method could further include the base station determining for each UE the quantity of data buffered at the UE by receiving from the UE a buffer status report indicating the quantity of data buffered at the UE.

Further, as discussed above, the air interface at issue could be divided over time into a continuum of TTIs, and each TTI could be divided over at least frequency into a plurality of the PRBs (e.g., with each PRB spanning 180 kHz and 0.5 milliseconds of time and being divided into an array of resource elements for modulating data (with the exception of resource elements reserved for other purposes)). And each UE's respective PRB/data ratio per unit time could be a PRB/data ratio per TTI or over a sliding window of TTIs or the like.

In line with the discussion above, the act of detecting that the first UE's PRB/data ratio has been threshold lower than each of the second UEs' PRB/data ratios could then take various forms. For instance, the base station could determine that the first UE's PRB/data ratio has been threshold low (e.g., lower than a first predefined threshold level) and that each of the second UEs' PRB/data ratio has been threshold high (e.g., higher than the first or a second predefined threshold level). Or the base station could determine, based on a comparison of the first UE's PRB/data ratio with each second UE's PRB/data ratio, that the first UE's PRB/data ratio has been lower than each second UE's PRB/data ratio, perhaps lower by any amount or lower than a predefined threshold amount deemed sufficient to represent possible lack of fairness in PRB allocation.

Further, as discussed above, the base station could serve each UE with a respective MCS that defines at least a quantity of data (e.g., bearer data) represented by each PRB allocated to the UE. And the act of selecting the second UE based on the MCS that the base station is serving the selected second UE with could also take various forms. For example, the base station could compare the MCSs that the base station is serving the second UEs with and could determine, based on the comparing, that the MCS the base station is serving a particular one of the second UEs with is highest-order among the MCSs that the base station is serving the second UEs with. And as another example, the base station could determine that the MCS the base station is serving a particular one of the second UEs with is higher-order than a predefined threshold level deemed high enough to justify limiting the UE's PRB allocation. In any event, based on the base station's determination, the base station could then select the particular second UE to have its PRB allocation limited and thus to have its PRB/data ratio reduced.

In turn, the act of the base station then limiting PRB allocation to the selected second UE to reduce the selected second UE's PRB/data ratio could then also take various forms. For example, if we assume that the base station in normal practice applies a particular scheduling algorithm that gives weights to various factors as a basis to decide how many PRBs to allocate to the UE per unit time, the act of limiting the PRB allocation to the UE could involve the base station applying a scaling factor in that PRB allocation process for the selected second UE. For instance, the base station could bias down the PRB allocation to the UE by a certain percentage from what the base station might otherwise allocate based on factors such as QCI level and the like. Further or alternatively, the base station could scale down PRB allocation to the UE reducing one or more other scheduling factors that would normally lead to more PRBs being allocated to the UE, such as QCI level or the like.

Optimally through this process, the base station could thus reduce the PRB/data ratio of the selected UE, and perhaps thereby achieve improved fairness in PRB allocation.

Figure 3:
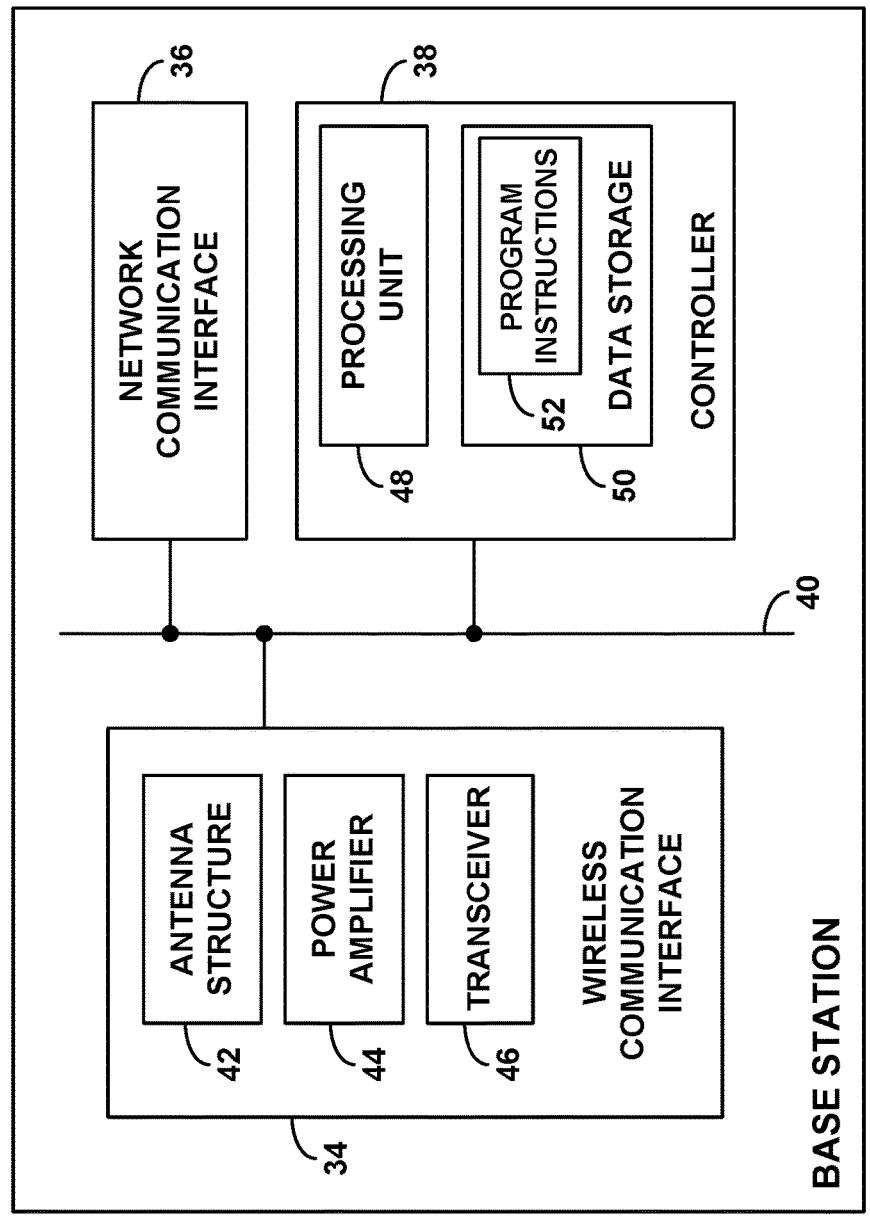
FIG. 3 is a simplified block diagram of a base station operable in accordance with the disclosure.

FIG. 3 is next a simplified block diagram of an example base station, showing some of the components that can be included in such an entity to help carry out features such as those discussed above. The example base station here could generally take various forms, including for instance, a macro base station including a tower mounted antenna structure and strong power amplifier for providing wide coverage, a small cell (e.g., femtocell) having a smaller antenna structure and reduced-power amplifier for providing a smaller range of coverage, or a relay base station, among others. As shown in FIG. 3, the example base station could include a wireless communication interface 34, a network communication interface 36, and a controller 38, which could be integrated in various ways and/or interconnected by a system bus, network, or other communication mechanism 40.

The wireless communication interface 34 operates to provide for air interface communication between the base station and UEs, in the manner discussed above for instance. As shown, the wireless communication interface 34 could thus include an antenna structure 42, power amplifier 44, and transceiver 46, cooperatively configured to engage in communication over the air interface with the UEs, or could take any of a variety of other forms.

The network communication interface 36 then operates to provide for communication with other network entities, such as the SGW and MME described above, and perhaps with other base stations. Thus, the network communication interface could comprise a wired or wireless Ethernet interface or could take any of a variety of other forms.

And the controller 38 then operates to facilitate and control allocation of air interface resources in line with the discussion above for instance. As such, the controller could comprise hardware, firmware, and/or software, configured to cause the base station to carry out the various operations described above. For instance, as shown in the figure, the controller could include a processing unit 48 (e.g., one or more general purpose processors and/or specialized processing units), non-transitory data storage 50 (e.g., one or more volatile and/or non-volatile storage units such as magnetic, optical, or flash storage), and program instructions 52 stored in the data storage and executable by the processing unit to carry out the operations described above.

Exemplary embodiments have been described above. Those skilled in the art will understand, however, that changes and modifications may be made to these embodiments without departing from the true scope and spirit of the invention.

We claim:

1. A method of controlling air interface resource allocation by a base station in a wireless communication system in which the base station serves over an air interface at least a first user equipment device (UE) and a plurality of second UEs, wherein the air interface has a predefined quantity of physical resource blocks (PRBs) per unit time for carrying data in a direction between the base station and UEs, and wherein each UE has a respective PRB/data ratio per unit time, each UE's respective PRB/data ratio per unit time defining a ratio per unit time of (i) number of PRBs allocated by the base station to the UE for transmission of data in the direction between the base station and the UE to (ii) quantity of data queued for transmission in the direction between the base station and the UE, the method comprising:

detecting by the base station that the first UE's PRB/data ratio has been threshold lower than each of the second UEs' PRB/data ratios; and responsive to the detecting, (i) selecting by the base station at least one of the second UEs, wherein the selecting is based on a modulation and coding scheme (MCS) that the base station is serving the selected second UE with, and (ii) based on the selecting, limiting PRB allocation to the selected second UE by the base station to reduce the selected second UE's PRB/data ratio.

2. The method of claim 1, wherein the direction is downlink, wherein the quantity of data queued for transmission in the direction between the base station and a UE is a quantity of data buffered at the base station and awaiting transmission over the air interface from the base station to the UE.

3. The method of claim 1, wherein the direction is uplink, wherein the quantity of data queued for transmission in the direction between the base station and the UE is a quantity of data buffered at the UE and awaiting transmission over the air interface from the UE to the base station, the method further comprising the base station determining for each UE the quantity of data buffered at the UE by receiving from the UE a buffer status report indicating the quantity of data buffered at the UE.

4. The method of claim 1, wherein the air interface is divided over time into a continuum of transmission time intervals (TTIs), wherein each TTI is divided over at least frequency into a plurality of the PRBs, and wherein each UE's PRB/data ratio per unit time is a PRB/data ratio per TTI.

5. The method of claim 1, wherein the air interface is divided over time into a continuum of transmission time intervals (TTIs), wherein each TTI is divided over at least frequency into a plurality of the PRBs, and wherein each UE's PRB/data ratio per unit time is a PRB/data ratio over a sliding window of TTIs.

6. The method of claim 1, wherein each PRB spans 180 kHz and 0.5 milliseconds and is divided into an array of resource elements for modulating data.

7. The method of claim 1, wherein detecting by the base station that the first UE's PRB/data ratio has been threshold lower than each of the second UEs' PRB/data ratios comprises:

determining by the base station that the first UE's PRB/data ratio has been threshold low and that each of the second UEs' PRB/data ratio has been threshold high.

8. The method of claim 1, wherein detecting by the base station that the first UE's PRB/data ratio has been threshold lower than each of the second UE's PRB/data ratios comprises:

determining by the base station, based on a comparison of the first UE's PRB/data ratio with each second UE's PRB/data ratio, that the first UE's PRB/data ratio has been lower than each second UE's PRB/data ratio.

9. The method of claim 1, wherein the base station serves each UE with a respective MCS that defines at least a quantity of data represented by each PRB allocated to the UE, and wherein selecting by the base station the second UE based on the MCS that the base station is serving the selected second UE with comprises:

comparing the MCSs that the base station is serving the second UEs with;

determining, based on the comparing, that the MCS the base station is serving a particular one of the second UEs with is highest-order among the MCSs; and based on the determining, selecting the particular second UE.

10. The method of claim 1, wherein the base station serves each UE with a respective MCS that defines at least a quantity of data represented by each PRB allocated to the UE, and wherein selecting by the base station the second UE based on the MCS that the base station is serving the selected second UE with comprises:

determining that the MCS the base station is serving a particular one of the second UEs with is higher-order than a predefined threshold; and based on the determining, selecting the particular second UE.

11. The method of claim 1, wherein limiting PRB allocation to the selected second UE by the base station to reduce the selected second UE's PRB/data ratio comprises applying by the base station a scaling factor in scheduling PRB allocation for the selected second UE.

12. A base station configured to control air interface resource allocation when the base station serves over an air interface at least a first user equipment device (UE) and a plurality of second UEs, wherein the air interface has a predefined quantity of physical resource blocks (PRBs) per unit time for carrying data in a direction between the base station and UEs, and wherein each UE has a respective PRB/data ratio per unit time, each UE's respective PRB/data ratio per unit time defining a ratio per unit time of (i) number of PRBs allocated by the base station to the UE for transmission of data in the direction between the base station and the UE to (ii) quantity of data queued for transmission in the direction between the base station and the UE, the base station comprising:

a wireless communication interface, including an antenna structure and transceiver, configured to communicate over the air interface with the UEs; and a controller for controlling the air interface resource allocation, wherein the controller is configured to (a) detect that the first UE's PRB/data ratio has been threshold lower than each of the second UEs' PRB/data ratios and (b) responsive to the detecting, (i) select at least one of the second UEs, wherein the selecting is based on a modulation and coding scheme (MCS) that the base station is serving the selected second UE with, and (ii) based on the selecting, limit PRB allocation to the selected second UE to reduce the selected second UE's PRB/data ratio.

13. The base station of claim 12, wherein the controller comprises a processing unit, data storage, and program instructions stored in the data storage and executable by the processing unit to carry out the detecting, selecting, and limiting.

14. The base station of claim 12, wherein the direction is downlink, wherein the quantity of data queued for transmission in the direction between the base station and a UE is a quantity of data buffered at the base station and awaiting transmission over the air interface from the base station to the UE.

15. The base station of claim 12, wherein the direction is uplink, wherein the quantity of data queued for transmission in the direction between the base station and the UE is a quantity of data buffered at the UE and awaiting transmission over the air interface from the UE to the base station, the controller being further configured to determine for each UE the quantity of data buffered at the UE by receiving from the UE a buffer status report indicating the quantity of data buffered at the UE.

16. The base station of claim 12, wherein the air interface is divided over time into a continuum of transmission time intervals (TTIs), wherein each TTI is divided over at least frequency into a plurality of the PRBs, and wherein each UE's PRB/data ratio per unit time is a PRB/data ratio over a sliding window of one or more TTIs.

17. The base station of claim 12, wherein detecting that the first UE's PRB/data ratio has been threshold lower than each of the second UEs' PRB/data ratios comprises:
   determining that the first UE's PRB/data ratio has been threshold low and that each of the second UEs' PRB/data ratio has been threshold high.

18. The base station of claim 12, wherein detecting that the first UE's PRB/data ratio has been threshold lower than each of the second UE's PRB/data ratios comprises:
   determining, based on a comparison of the first UE's PRB/data ratio with each second UE's PRB/data ratio, that the first UE's PRB/data ratio has been lower than each second UE's PRB/data ratio.

19. The base station of claim 12, wherein the base station serves each UE with a respective MCS that defines at least a quantity of data represented by each PRB allocated to the UE, and wherein selecting the second UE based on the MCS that the base station is serving the selected second UE with comprises:
   comparing the MCSs that the base station is serving the second UEs with;
   determining, based on the comparing, that the MCS the base station is serving a particular one of the second UEs with is highest-order among the MCSs; and
   based on the determining, selecting the particular second UE.

20. The base station of claim 12, wherein limiting PRB allocation to the selected second UE by the base station to reduce the selected second UE's PRB/data ratio comprises applying by the base station a scaling factor in scheduling PRB allocation for the selected second UE.

\* \* \* \* \*